United States Patent [19]
Schroeder

[11] Patent Number: 5,393,106
[45] Date of Patent: Feb. 28, 1995

[54] SEALED KNOCK-DOWN DUCT COLLAR

[75] Inventor: Clifford Schroeder, San Fernando, Calif.

[73] Assignee: CASCO Manufacturing, San Fernando, Calif.

[21] Appl. No.: 121,937

[22] Filed: Sep. 15, 1993

[51] Int. Cl.⁶ ............................................. F16L 41/02
[52] U.S. Cl. .................................... 285/158; 285/424
[58] Field of Search ............... 285/158, 183, 424, 915, 285/405

[56] References Cited

U.S. PATENT DOCUMENTS

| | | | |
|---|---|---|---|
| 2,224,208 | 12/1940 | Acer | 285/183 |
| 2,963,783 | 12/1960 | Field | 285/183 |
| 4,009,895 | 3/1977 | Koskolois | 285/158 |
| 4,147,382 | 4/1979 | Wachter | 285/424 |
| 4,249,758 | 2/1981 | Harris | 285/158 |
| 4,294,476 | 10/1981 | Nash | 285/424 |
| 4,491,124 | 1/1985 | Goettel | 285/158 |
| 4,620,729 | 11/1986 | Kauffman | 285/158 |
| 4,930,815 | 6/1990 | Tuggler, Jr. | 285/158 |

FOREIGN PATENT DOCUMENTS 2056005  3/1981  United Kingdom ................. 285/158

Primary Examiner—Eric K. Nicholson
Attorney, Agent, or Firm—David O'Reilly

[57] ABSTRACT

A completely sealed knock-down collar for joining heating and cooling ducts to plenums. The knock-down collar is formed from an elongate sheet metal strip punched with a plurality of tabs along one edge, a plurality of diagonal slits spaced from the tabs, a target on one end and a slot on the other. The sheet metal strip is rolled into a tubular shape with diagonal slits forming a herringbone mounting flange and the tongue fitting the slot to lock the strip in the tubular shape. A non-drying sealer is provided beneath the herringbone mounting flange and along one end to seal the collar when mounted in a plenum.

5 Claims, 4 Drawing Sheets

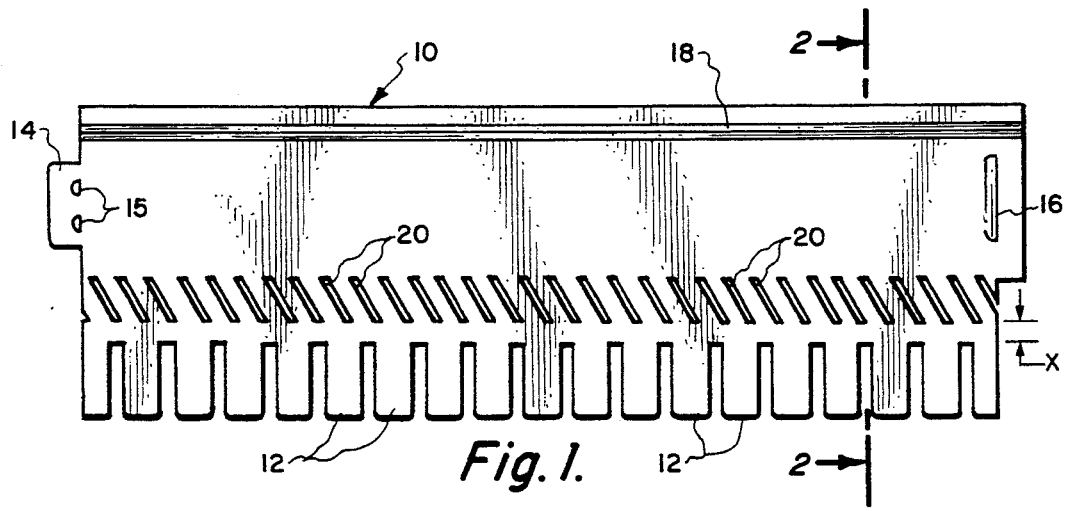
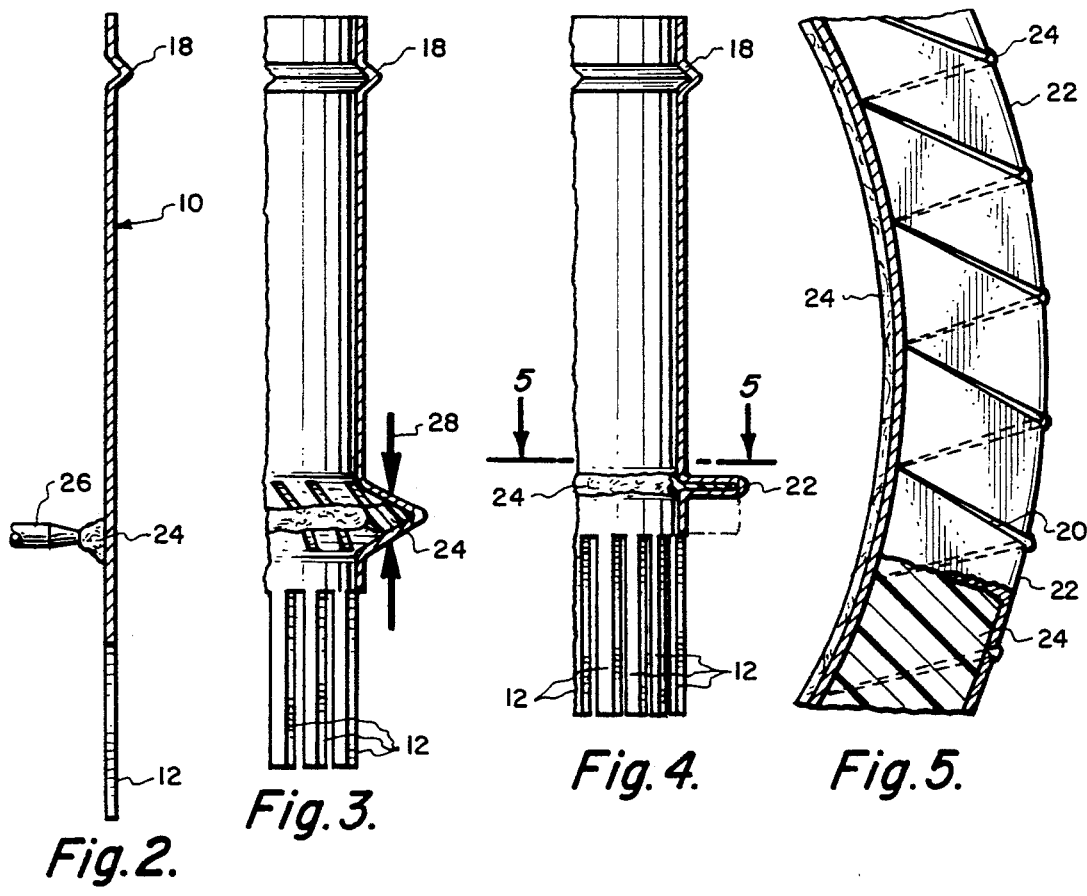

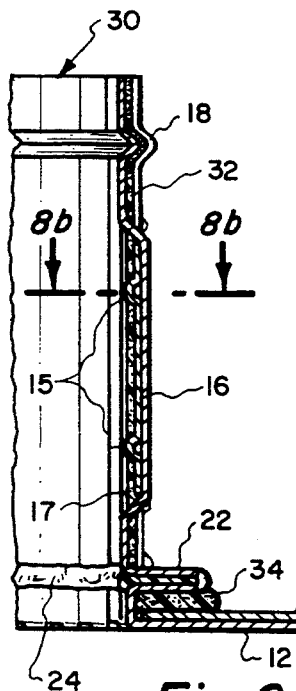
Fig. 8a.
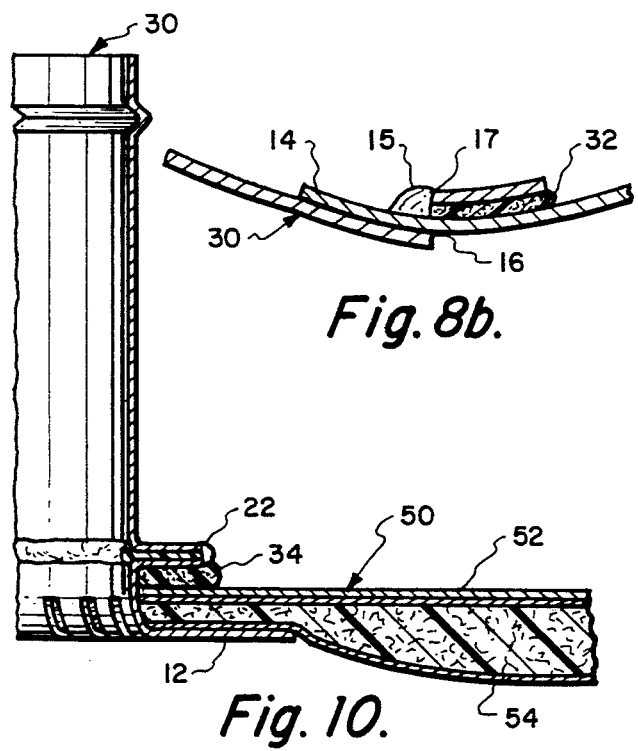
Fig. 8b.
Fig. 10.
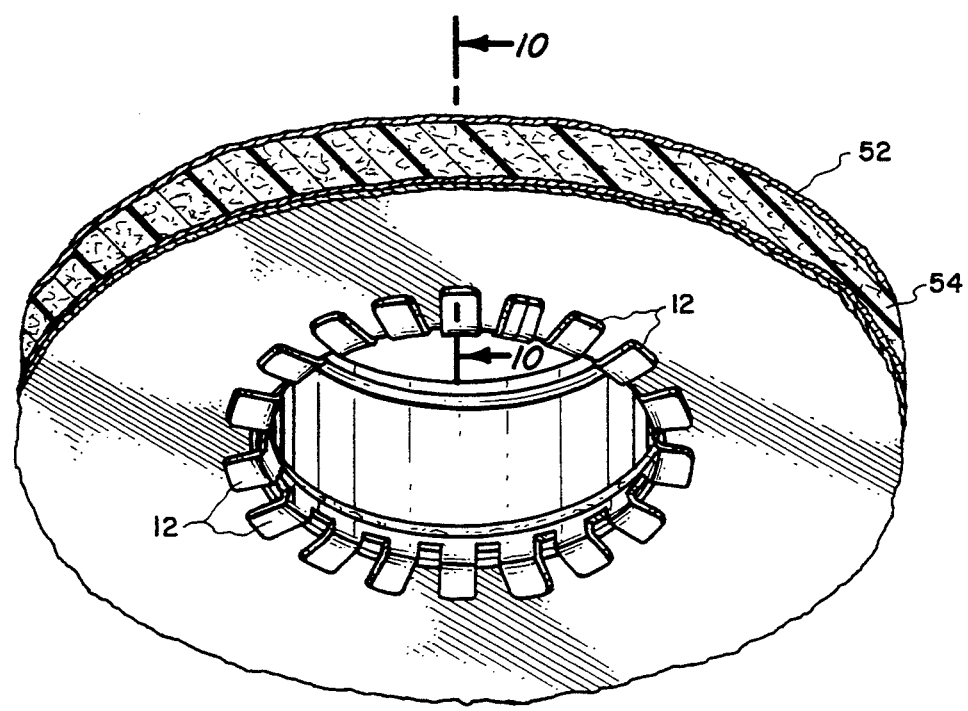
Fig. 9.

SEALED KNOCK-DOWN DUCT COLLAR

FIELD OF THE INVENTION

This invention relates to fittings for duct for air conditioning and heating systems and more particularly relates to a completely sealed knock-down collar for connecting duct to air return and inlet plenums.

BACKGROUND OF THE INVENTION

Duct collars connect air inlet and return plenums to heating and cooling duct and must be securely fastened to maximize the flow of air. This is particularly important in the systems that use high pressure and velocity for delivering the air. These duct collars are usually made of sheet metal and are fastened by screws and bolts to the duct and to the air returns which are also made of sheet metal, duct board, or pressed fiberglass. A problem with this connections is leakage when the system uses high pressure and velocity delivery of the air.

Also, the duct collars are usually made with a flange to seat against the air return. The flange is generally made by bending and compressing a section of sheet metal to form a flange. To simplify the construction, diagonal slits are made in a strip of sheet metal which is then bent outward and compressed. These types of flange are called "herringbone flanges". Since these herringbone flanges are formed by a series of diagonal slits in the sheet metal, they can be sources of leakage. Additionally, the bottom and top areas of the flange where they join the duct and the air inlets and returns can also be an area of leakage.

It is therefore an object of the present invention to provide knock-down collar for duct connections that is completely sealed.

Still another object of the present invention is to provide a knock-down collar having a sealed flange for securing the collar to air inlets and returns.

Yet another object of the present invention is to provide a completely sealed knock-down collar that is easily and quickly attached to a duct and the wall of air inlets and returns.

Yet another object of the present invention is to provide a sealed collar for connecting duct work to air inlets and returns that includes a sealer around all edges to prevent leakage.

BRIEF DESCRIPTION OF THE INVENTION

The purpose of the present invention is to provide a unique completely sealed, knock-down collar for connecting heating and cooling duct to air inlets and return plenums that prevents leakage when used in high pressure and velocity air delivery systems.

The duct collar is constructed of sheet metal formed to be easily installed with a minimum of tools. A long strip of sheet metal is punched and rolled into a cylinder or tubular shape to form the collar. One edge of the sheet metal strip is slotted to form a plurality of tabs for quickly fastening the collar to duct board or the flat surface of an air inlet or return plenum. The opposite edge of the cylinder has a ridge formed by crimping the sheet metal to secure the collar to the duct.

Adjacent to, and slightly above the tabs formed along the one edge, a plurality of diagonal slits are punched in the strip of sheet metal to form an area that can produce a flange to seat the collar against a plenum surface when it is installed. A rolling tool crimps the area of the diagonal slits to form a herringbone flange. Prior to bending the diagonal slotted area, a track of hot melt adhesive is laid down on the sheet metal so that the flange, when formed, is completely sealed by the adhesive. Preferably, the adhesive is a hot melt glue that flows into all crevices and seals as it cures. The herringbone mounting flange is formed simultaneously as the sheet is rolled into a cylinder.

Opposite ends of the sheet metal strip are formed with a tongue on one end and a slot in the other end. This permits the ends of the sheet, when rolled into a tube to be locked together during installation. The tongue has a pair of dimples formed in it that click into the slot in the opposite end and securely fasten the respective ends of the rolled sheet metal when installed.

The vertical edge adjacent to the slot, on one end of the sheet metal strip, has a non-drying sealer applied so when the ends of the sheet metal are brought together in a tube, the connection is completely sealed. Non-drying sealer is also applied beneath the herringbone mounting flange to abut the surface of the air inlet or return plenum to completely seal the collar when installed.

To install the collar, the tongue is fitted into the groove until the dimples click into place in the slot to form a sealed tube. The collar is then inserted in an aperture in the air inlet or return plenum, and the tabs bent under to securely fasten and seal the flange against the surface of the air return or inlet plenum. The diagonal slits used to form the flange are spaced from the upper ends of the tabs an amount that is approximately equal to the thickness of a sheet metal plenum to insure that a complete seal is formed when the collar is attached to a plenum. Thus the collar is completely sealed between the herringbone mounting flange and the surface of the plenum by bending the tabs to compress the non-drying sealer.

The spacing between the upper end of the mounting tabs and the bottom surface of the herringbone flange is selected to allow the collar to be used with any of the three types of plenums. One type is a sheet metal plenum that has a thin wall while other types of plenums having fiberglass insulation or duct board. The collar once formed, is uniquely constructed to fit and seal against all these types of plenums.

The above and other novel features and advantages of this invention will be more fully understood from the following detailed description and the accompanying drawings in which:

BRIEF DESCRIPTION OF THE DRAWINGS

FIG. 1 is a view of a sheet metal strip prepared to form the sealed knock-down collar.

FIGS. 2 through 5 illustrate the formation of the herringbone mounting flange sealed by an adhesive.

FIGS. 8a and 8b illustrate the installation of a completely sealed knock-down collar in a sheet metal plenum.

FIGS. 9 and 10 illustrate the installation of the duct collar in a fiberglass insulated sheet metal plenum.

FIGS. 1 and 12 illustrate the installation of the duct collar in a pressed fiberglass or duct board plenum.

Figure 6:
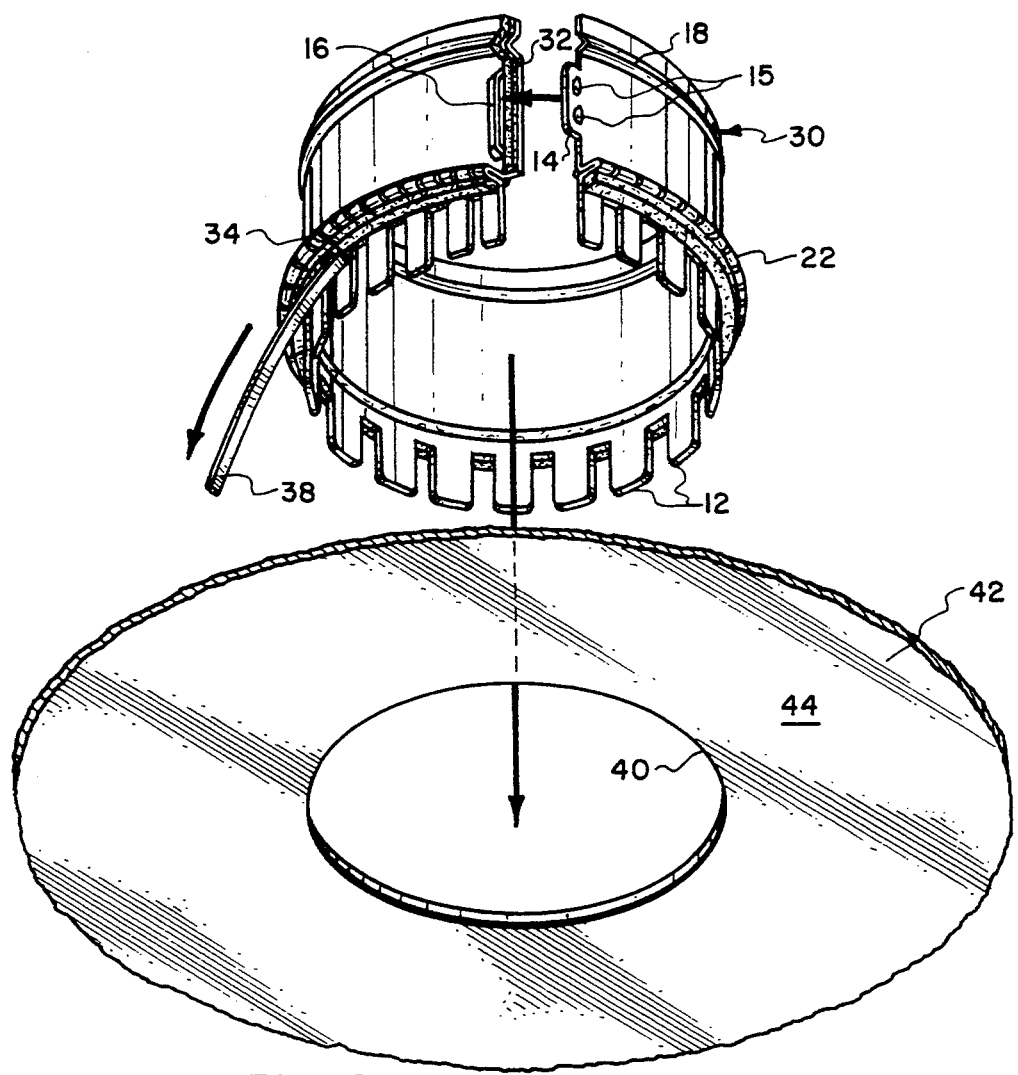
FIGS. 6 and 7 illustrate the application of non-drying sealer to the collar and the installation of the collar in a plenumn.

The above and other novel features of the invention will be more fully understood from the following detailed description and the accompanying drawings, in which:

DETAILED DESCRIPTION OF THE INVENTION

The knock-down collar is formed from sheet metal strip 10 that is pre-cut or punched as illustrated in FIG. 1. Sheet metal strip 10 will have a length that varies depending upon the size of the duct that it is to be used with. Thus, for a six inch diameter collar, the length would be approximately 29 inches. Sheet metal strip 10 is punched is a punched press to form a plurality of tabs 12, tongue 14, locking slot 16 and a ridge 18 along one edge to abuts the duct it is to be installed with. Dimples 15 are provided in tongue 14 for engaging slot 16 to secure sheet metal strip 10 in a tubular form as will be described in greater detail hereinafter.

A plurality of diagonal slits 20 are cut along the length to prepare the sheet metal strip 10 from forming a mounting flange which will be described in greater detail hereinafter. Slits 20 are punched to provide a flat area between tabs 12 and the flange indicated at X which will be approximately equal to the thinnest wall of material that the collar will be mounted on. Generally, this will be a sheet metal plenum. Also, tabs 12 will be at least one inch or more in length to allow the collar to be firmly attached to a variety of plenums.

A collar formed from sheet metal strip 10 as described can fit any of the three types of plenums now being used. The thinnest of these will be the plain sheet metal box which will have a thickness approximately equal to the width X indicated in FIG. 1. Another type of return that this collar will fit is a sheet metal return having a insulated fiberglass liner. The third type is the pressed fiberglass duct board plenum. A collar constructed according to the invention can be mounted on all three types of returns without changing the collar.

In addition, the unique knock-down collar is constructed to be completely sealed, thus providing the only knock-down duct mounting collar suitable for use in all high pressure and high velocity air systems.

The formation of the mounting flange 22 shown in FIG. 4 is illustrated in FIGS. 2 through 5. This herringbone mounting flange 22 allows the collar to seat against the outside surface of an air inlet or return plenum. Mounting flange 22 is formed by applying a hot melt adhesive or glue 24 to the surface of sheet metal strip 10 at the approximate center of herringbone slits 20. Hot melt glue 24 is laid down by nozzle 26 as sheet metal strip 10 passes along a conveyer (not shown) through a punching and roll-forming machine. The roll-forming machine (not shown) compresses the sheet metal strip 10 in the approximate center of herringbone slits 20 as indicated at arrows 28 in FIG. 3. The roll-forming machine continues to compress the herringbone slits until adhesive 24 is fully clamped between the flange 22 as illustrated in FIG. 4. When complete, herringbone flange 22 provides a mounting surface as illustrated in FIG. 5 with adhesive 24 completely sealing the flange to prevent leakage.

When rolling and sealing of herringbone flange 22 is completed, sheet metal strip 10 forms a cylindrical collar 30 as illustrated in FIG. 6. Previously, attempts have been made to seal collars after installation by applying various glues and using masking tapes, but they have not been that successful. To further seal collar 30 when installed, a non-drying sealer 32 is applied to the surface along one edge of the collar adjacent slot 16. The non-drying sealer is continued at 34 beneath the edge of herringbone flange 22. Collar 30 is shipped in the position illustrated in FIG. 6, slightly open with a relief paper 38 covering non-drying sealer 32 and 34 along one edge adjacent slot 16 and beneath herringbone flange 22.

Figure 7:
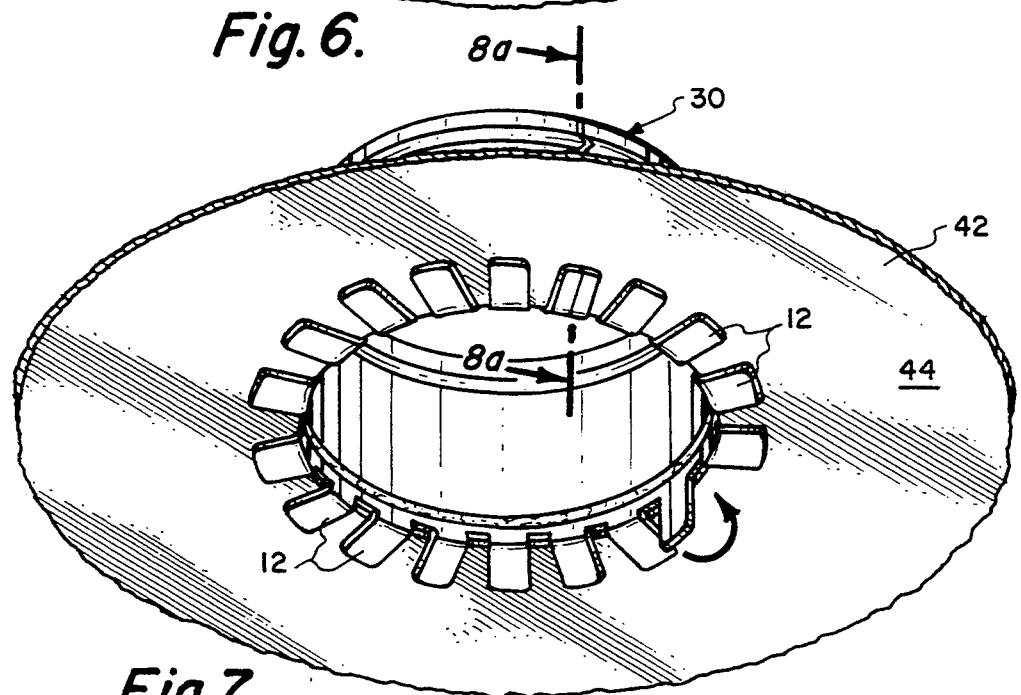

The installation of collar 30 in a sheet metal air return is illustrated in FIGS. 6 and 7. To install collar 30, tongue 14 is inserted in slot 16 until dimples 15 pass through and catch on opposite lower edge 17 of slot 16. This locks collar 13 into a tubular of cylindrical form for insertion in hole 40 in sheet metal plenum 42. Once tongue 14 is locked in slot 16, collar 30 may then be placed in hole or aperture 40 in sheet metal plenum 42. Tabs 12 are then bent tightly down around the interior surface 44 compressing non-drying sealer 34 between herringbone flange 32 and the outer surface of sheet metal plenum 42.

This provides a completely sealed installation as illustrated in FIGS. 8a and 8b. Dimples 15 engage the lower edge 17 of slot 16 with non-drying sealer 32 compressed between the respective ends. This seals the connection between the respective ends forming sealed collar 30. Adhesive 24 seals herringbone flange 22 preventing leakage that has previously presented problems. Non-drying sealer 34 is compressed between upper surface 45 of sheet metal plenum 42 to seal the periphery of flange 22 against non-drying sealer 34.

Preferably, non-drying sealer 34 is a synthetic polymer caulking compound that adheres to dry surfaces. Sealer 34 should be non-corrosive and pliable, and covered with release paper 38 to allow stacking of the collars 30 for shipping purposes.

The connection of tongue 14 with slot 16 is shown in greater detail in FIG. 8b. Tongue 14 and dimples 15 pass through slot 16 engaging the lower surface edge 17 locking the ends together. Non-drying synthetic polymer sealer 32 is compressed between the respective ends of the connection preventing leakage.

As is described above, the sealed knock-down collar, according to the invention, is applicable to all types of air return plenums or inlets. FIG. 9 and 10 illustrate the connection of sealed collar 32 to sheet metal plenum 50 having fiberglass insulation. Plenum 50 is comprised of sheet metal wall 52 insulated with fiberglass liner 54. Collar 30 comfortably fits on this fiberglass lined plenum 50 because the spacing between tabs 12 and herringbone flange 22, combined with the length of the tabs, allows easy mounting. Tabs 12 are pressed securely against the fiberglass liner 54 with herringbone flange 22 compressing non-drying sealer 34 against sheet metal outer seal 52. As is evident from the illustration, collar 30 is easily installed with a minimum of tools or even no tools at all.

Figure 11:
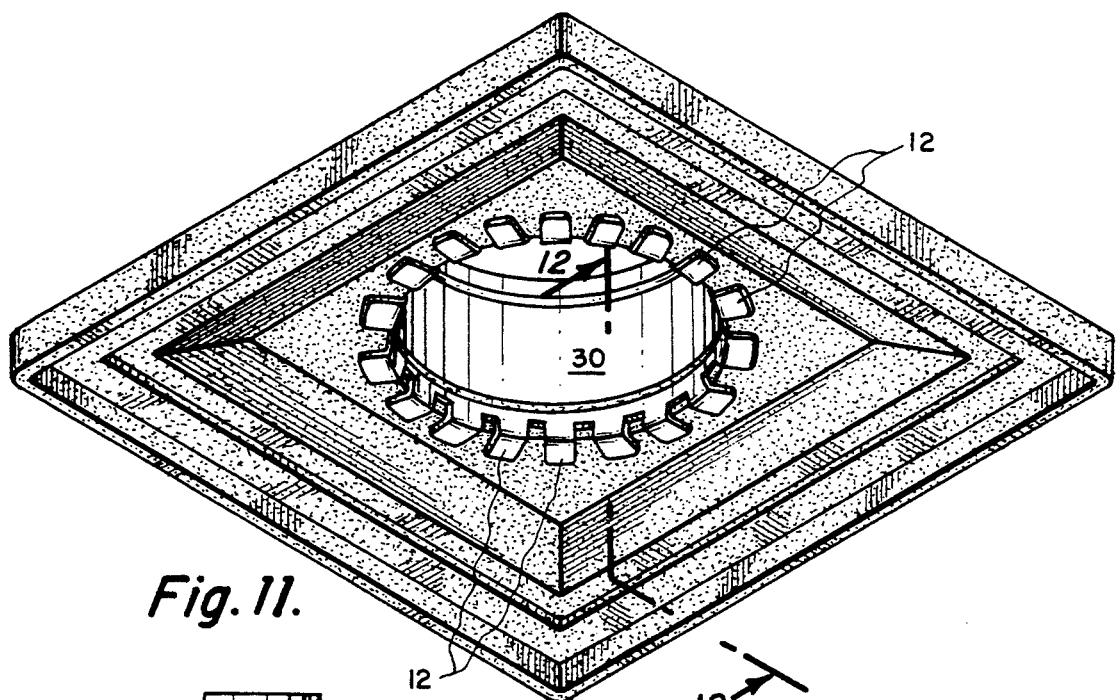
Figure 12:
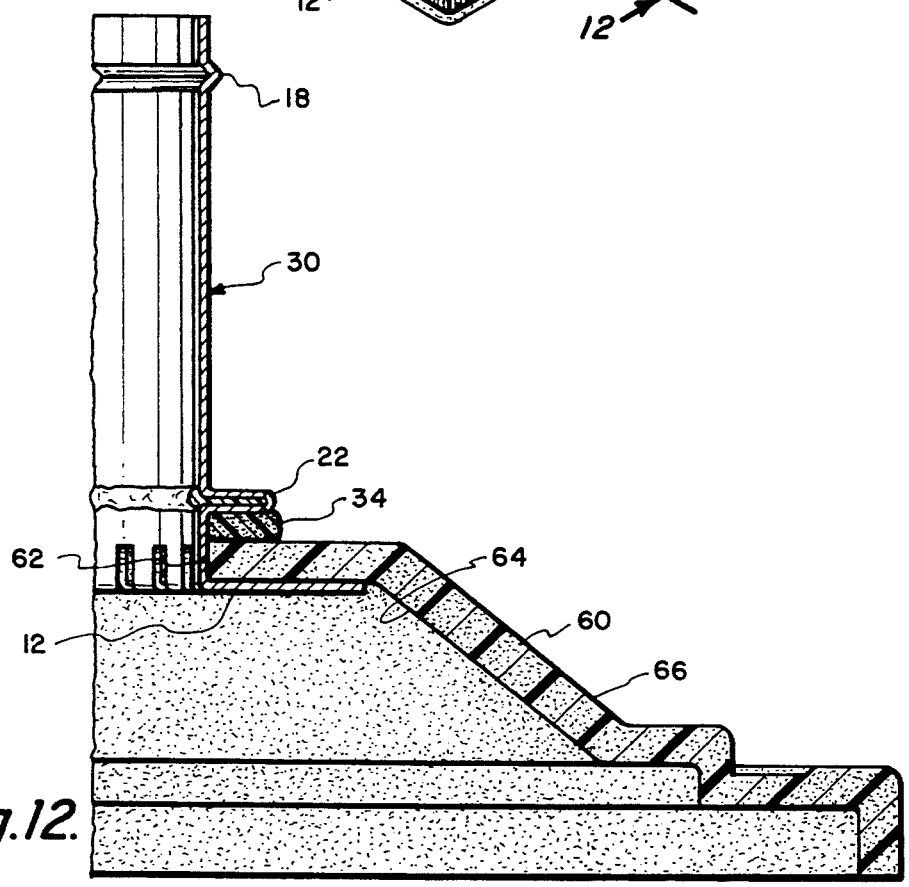

The installation of the sealed collar 30 in a duct board, or compressed fiberglass plenum is illustrated in FIGS. 11 and 12. Compressed fiberglass plenum 60 has an aperture 62 for receiving collar 30 as before. Collar 30 is fitted into aperture 62 in plenum 60 and tabs 12 bent over against the inside surface 64 of plenum 60 to clamp herringbone flange 22 against the outer surface 66 squeezing non-drying sealer 43 between collar 30 and plenum 60. As shown in the various air return and inlet plenums, collar 30 is universal in application and is completely sealed to prevent leakage.

This invention is not to be limited by the embodiment shown in the drawings and described in the description which is given by way of example and not of limitation, but only in accordance with the scope of the appended claims.

What is claimed is:

1. A completely sealed adaptable duct collar for a connecting a variety of ducts to air intake and return plenums comprising;
   a tubular member;
   a plurality of bendable tab means formed on one end of said tubular member;
   sealed mounting flange means formed in said tubular member circumjacent said plurality of bendable tab means, said sealed mounting flange means being a herringbone flange formed of a plurality of slits in said tubular member bent radially outward with a sealing means compressed therebetween, the length of said tab means and the spacing of said sealed mounting flange means from an inner end of said bendable tab means being preselected to allow said collar to be mounted on intake and return plenums having a variety of wall thicknesses;
   non-drying sealing means on said mounting flange means circumjacent said spacing between the inner end of said bendable tab means and said mounting flange means;
   whereby said duct collar is adaptable to secure a duct to a wide variety of intake or return plenums by fitting said tab end of said duct collar in a hole in a plenum and bending said bendable tab means over to compress said non-drying sealing means against the surface of a plenum.

2. The duct collar according to claim 1 in which said sealing means compressed in said herringbone flange compresses a sealing adhesive inside said compressed herringbone flange.

3. The duct collar according to claim 2 in which said adhesive comprises a hot melt glue applied across said slits before they are compressed into said sealed mounting flange whereby said hot melt glue flows into the space between adjacent slits completely sealing said herringbone flange.

4. The duct collar according to claim 1 wherein said tubular member is comprised of a strip of sheet metal rolled into a tube; slot means at one end of said rolled sheet metal strip; tongue means on the other end of said sheet metal strip engaging said slot means to hold said rolled sheet metal strip in a tubular form; and non-drying sealing means along said slot and tongue ends on said strip of sheet metal to seal said ends of said tubular members when they are joined.

5. The duct collar according to claim 4 wherein said non-drying sealing means includes a release paper to protect said non-drying sealing means until ready for use.

* * * * *